(12) United States Patent
Kalantri et al.

(10) Patent No.: US 10,257,561 B2
(45) Date of Patent: Apr. 9, 2019

(54) TIME-LINE BASED DIGITAL MEDIA POST VIEWING EXPERIENCE

(71) Applicant: Disney Enterprises, Inc., Burbank, CA (US)

(72) Inventors: Neha Kalantri, Burbank, CA (US); Edward Drake, Burbank, CA (US); Kevin Liao, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/078,315

(22) Filed: Nov. 12, 2013

(65) Prior Publication Data
US 2015/0046949 A1 Feb. 12, 2015

Related U.S. Application Data

(60) Provisional application No. 61/864,473, filed on Aug. 9, 2013.

(51) Int. Cl.
| | | |
|---|---|---|
| *G06F 3/048* | (2013.01) |
| *H04N 21/431* | (2011.01) |
| *H04N 21/472* | (2011.01) |
| *H04N 21/478* | (2011.01) |
| *H04N 21/482* | (2011.01) |

(52) U.S. Cl.
CPC ....... *H04N 21/4312* (2013.01); *H04N 21/472* (2013.01); *H04N 21/47202* (2013.01); *H04N 21/47815* (2013.01); *H04N 21/4826* (2013.01); *G06F 3/048* (2013.01)

(58) Field of Classification Search
CPC .......... H04N 21/482; H04N 21/42204; H04N 21/431; H04N 21/4828; H04N 21/4312; H04N 21/47202; H04N 21/47815; H04N 21/4826; H04N 21/472; G06F 3/048
USPC ......................................... 725/37–39, 46, 52
See application file for complete search history.

(56) References Cited

U.S. PATENT DOCUMENTS

| | | | | |
|---|---|---|---|---|
| 6,690,391 | B1 * | 2/2004 | Proehl .................. | G06F 3/0362 715/720 |
| 6,910,191 | B2 * | 6/2005 | Segerberg et al. ........... | 715/830 |
| 8,832,590 | B1 * | 9/2014 | Al-Mohssen ............ | G09G 5/00 715/785 |
| 2003/0001907 | A1 * | 1/2003 | Bergsten ............... | G06F 3/0482 715/853 |
| 2003/0177495 | A1 * | 9/2003 | Needham et al. .............. | 725/55 |
| 2005/0141855 | A1 * | 6/2005 | Watanabe ................ | H04N 5/76 386/224 |
| 2005/0210410 | A1 * | 9/2005 | Ohwa ................... | G06F 3/0482 715/821 |

(Continued)

*Primary Examiner* — Benjamin R Bruckart
*Assistant Examiner* — Aklil M Tesfaye
(74) *Attorney, Agent, or Firm* — Sheppard Mullin Richter & Hampton LLP

(57) ABSTRACT

Disclosed are a digital media asset selection interface and method. The interface may comprise a plurality of digital media assets that are displayed to a user such that the user can navigate the digital media assets in a first direction and a second direction, such as a horizontal direction and a vertical direction. In a more particular embodiment, the digital media assets are listed horizontally such that assets listed to the left of a selection pane represent a "past" aspect and assets listed to the right of a selection pane represent a "future" aspect. The digital media assets listed vertically are related to one another in some way.

24 Claims, 8 Drawing Sheets

(56) References Cited

U.S. PATENT DOCUMENTS

| | | | |
|---|---|---|---|
| 2005/0257166 A1* | 11/2005 | Tu ........................ | G06F 3/0485 |
| | | | 715/787 |
| 2007/0044036 A1* | 2/2007 | Ishimura ................. | H04N 5/76 |
| | | | 715/810 |
| 2007/0192793 A1* | 8/2007 | Song et al. ..................... | 725/39 |
| 2009/0031350 A1* | 1/2009 | Yabe et al. ..................... | 725/39 |
| 2009/0199241 A1* | 8/2009 | Unger et al. .................... | 725/41 |
| 2009/0217204 A1* | 8/2009 | Yamashita .......... | G06F 17/3028 |
| | | | 715/838 |
| 2010/0192182 A1* | 7/2010 | Baldwin et al. ................ | 725/45 |
| 2011/0246440 A1* | 10/2011 | Kocks .............. | G06F 17/30781 |
| | | | 707/706 |
| 2011/0265002 A1* | 10/2011 | Hong ................. | G06F 3/04855 |
| | | | 715/702 |
| 2012/0174157 A1* | 7/2012 | Stinson et al. .................. | 725/40 |
| 2013/0042284 A1* | 2/2013 | Kandanala ....... | H04N 21/25891 |
| | | | 725/104 |
| 2014/0006951 A1* | 1/2014 | Hunter ................... | H04H 60/31 |
| | | | 715/719 |
| 2014/0033238 A1* | 1/2014 | Jeon et al. ...................... | 725/13 |
| 2014/0189747 A1* | 7/2014 | Shellman ........................ | 725/52 |

\* cited by examiner

TIME-LINE BASED DIGITAL MEDIA POST VIEWING EXPERIENCE

CROSS-REFERENCE TO RELATED APPLICATIONS

This application claims priority to U.S. Provisional Application No. 61/864,473, filed Aug. 9, 2013, which is incorporated herein by reference as if fully set forth herein.

TECHNICAL FIELD

The present disclosure relates generally to presentation of digital media, and more particularly to digital media interfaces.

BRIEF SUMMARY OF THE DISCLOSURE

The present disclosure may be embodied in a method comprising presenting a digital media selection interface and receiving a user input via a user input device. The digital media selection interface may present the user with a plurality of digital media assets. A first subset of the plurality of digital media assets may be presented in a first direction such that the user can navigate the first subset in the first direction, and a second subset of the plurality of digital media assets may be presented in a second directly such that the user can navigate the second subset in the second direction. The first subset of the plurality of digital media assets may comprise a past portion and a future portion such that the past portion comprises a plurality of past digital media assets that have been previously presented, and the future portion comprises a plurality of recommended digital media assets.

In a further aspect of this embodiment, a first digital media asset may be presented in a central region of the digital media selection interface and the plurality of digital media assets may be presented in the areas surrounding the central region. The first subset of the plurality of digital media assets may be presented horizontally from the first digital media asset, and the second subset may be presented vertically from the first subset.

In an even more particular aspect, receiving a user input via a user input device may comprise receiving a first user input to navigate the digital media selection interface in a horizontal direction to a second digital media asset, the second digital media asset being a member of the first subset of the plurality of digital media assets; and receiving a second user input to navigate the digital media selection interface in a vertical direction to a third digital media asset, the third digital media asset being a member of the second subset of the plurality of digital media assets.

In one aspect of this embodiment, the past portion may be presented to the left of the first digital media asset and the future portion may be presented to the right of the first digital media asset.

The future portion may comprise one or more digital media assets that have not been purchased. In a more particular aspect of this embodiment, receiving a user input via a user input device may comprise receiving a first user input to navigate the digital media selection interface in a rightward direction to a second digital media asset, the second digital media asset being a member of the plurality of future digital media assets that have not been purchased; and receiving a second user input to purchase the second digital media asset.

In another aspect of the disclosed method, receiving a user input via a user input device may comprise receiving a user horizontal scroll input, causing the first subset of the plurality of digital media assets to scroll in the horizontal direction, and further wherein, weight information associated with the plurality of digital media assets affects the rate of scrolling caused by the user horizontal scroll input.

In yet another aspect, the disclosed method may further comprise presenting a first digital media asset on a first display, and presenting a digital media selection interface may comprise presenting the digital media selection interface on a second display.

The present disclosure may also be embodied in a non-transitory computer readable medium comprising an instruction set configured to cause a computing device to perform the method described above.

The present disclosure may also be embodied in a digital media selection interface comprising a selection pane indicating a current digital media asset selection; a first set of digital media assets presented in a horizontal direction from the selection pane; a second set of digital media assets presented in a vertical direction from the first set of digital media assets; and a digital media stack formed by a first horizontal digital media asset that is a member of the first set of digital media assets, and one or more vertical digital media assets that are members of the second set of digital media assets. The first set of digital media assets presented in a horizontal direction may comprise a past portion that is presented to the left of the selection pane, and a future portion that is presented to the right of the selection pane. The past portion may comprise a plurality of digital media assets that have been previously presented, and the future portion may comprise a plurality of recommended digital media assets.

In a particular aspect of this embodiment, the digital media stack may be formed vertically from the selection pane. The digital media selection interface may further comprise one or more digital media stack indicators, wherein the one or more digital media stack indicators are associated with one or more members of the first set of digital media assets presented in a horizontal direction such that the one or more digital media stack indicators indicate that a digital media stack will be formed when the associated member of the first set of digital media assets is positioned within the selection pane.

In another aspect of this embodiment, the future portion may comprise a plurality of digital media assets that have not been purchased.

In yet another aspect of this embodiment, the selection pane may remain stationary in a central region of the digital media selection interface.

In another aspect, the digital media selection interface may further comprise a timeline indicator that provides the user with an indication of how far they have scrolled in a particular direction.

Other features and aspects of the disclosure will become apparent from the following detailed description, taken in conjunction with the accompanying drawings, which illustrate, by way of example, the features in accordance with various implementations.

BRIEF DESCRIPTION OF THE DRAWINGS

The drawings are provided for purposes of illustration only and merely depict typical or example implementations. These drawings are provided to facilitate the reader's understanding and shall not be considered limiting of the breadth.

DETAILED DESCRIPTION

The disclosure provided herein describes systems and methods for providing users with digital media interfaces.

In modern digital media entertainment applications, after consuming a digital media asset, consumers are generally returned back to the previous interface of the application (where they first selected the specific digital media asset) or a static list of other digital media assets based on some proprietary recommendation algorithm. For example, immediately after watching a video file on some streaming service, consumers are generally taken back to the very same description page of the video file where they opted to play the movie to begin with. In other cases, consumers might be shown a static list of other titles similar to the just-played video file. These are not very efficient uses of increasingly valuable digital screen real estate and do not entice the consumers to stay within the service and consume more content.

Figure 1:
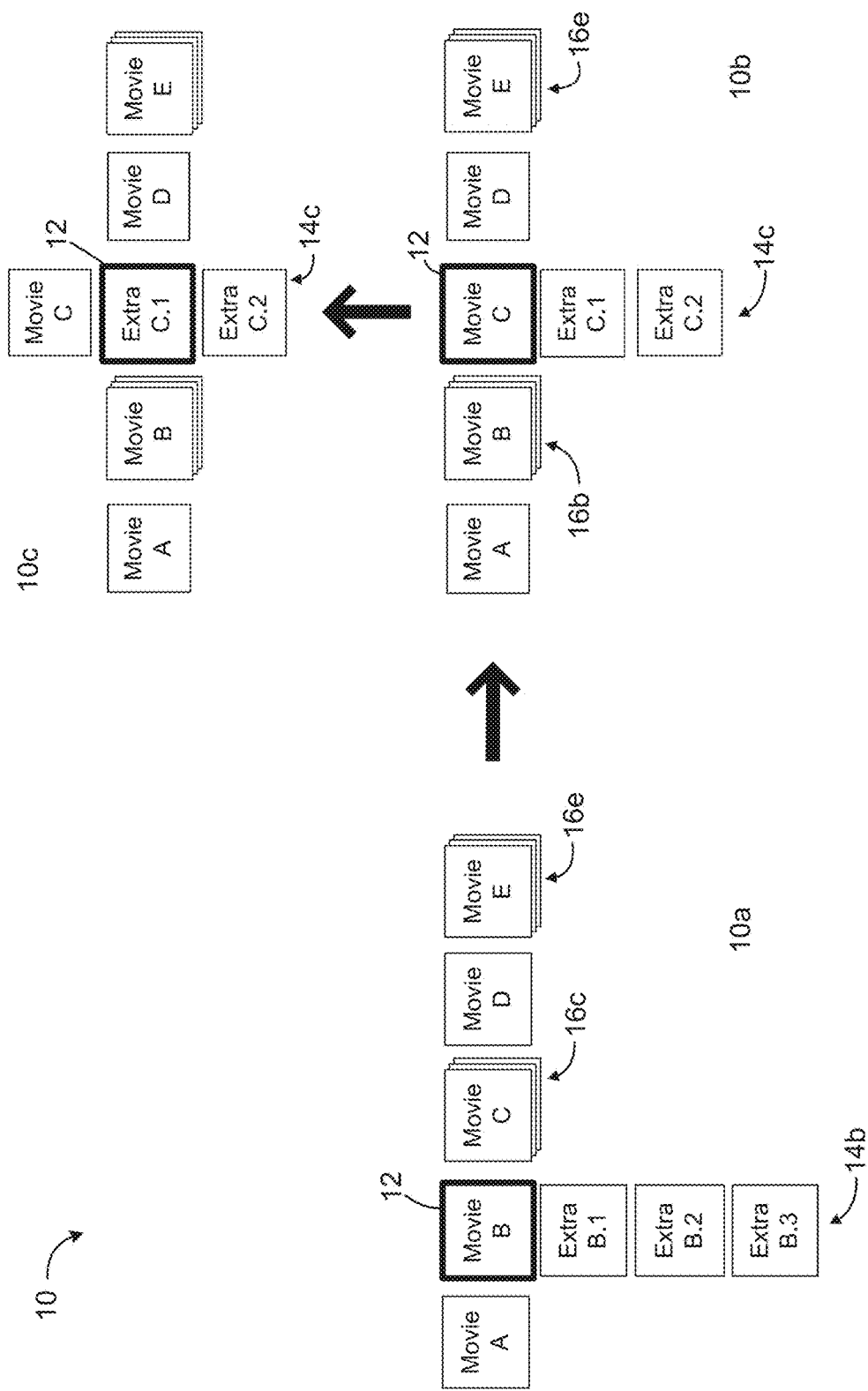
FIG. 1 is an image flowchart depicting an example digital media selection interface in accordance with an embodiment of the present disclosure.

The present disclosure provides for an improved digital media interface. As the user finishes a media content asset, the user is provided with a digital media asset carousel through which they are able to browse through a selection of other digital media assets. One embodiment of the digital media interface 10 is provided in FIG. 1. A selection pane 12 indicates the current selection, from which the user may navigate in either a horizontal or vertical direction. For example, as shown in FIG. 1, different movies may be horizontally aligned, and then "Extras" associated with each movie may form stacks 14 underneath the movie vertically. The stacks 14 may include any digital media assets that are related to each other. For example, in step 10a, Extras B.1 and B.2 may comprise trailers for Movie B, posters, images, or photographs relating to Movie B, or a sequel or prequel to Movie B, or other movies in the same genre as Movie B, etc. Organization or creation of stacks may be performed automatically based on sort criteria, or they may be created by a user based on a user's preferred categorization. Rather than displaying all stacks for all digital media assets, digital media assets outside of the selection pane 12 may include stack indicators 16 which, once the horizontal media asset is selected, expand into a stack 14.

In screen 10a, the selection pane is on Movie B, and a stack 14b is expanded underneath Movie B. The user may navigate vertically to select Extra B.1 or Extra B.2, or the user may navigate horizontally to the other Movies A, C, D, or E. In screen 10b, the user has entered an input command to navigate to the right to Movie C. It can be seen that the selection pane 12 now surrounds Movie C, and stack 14b under Movie B has been collapsed into a stack indicator 16b, while the stack indicator 16c underneath Movie C has expanded into a stack 14c. In screen 10c, the user has navigated downward to Extra C.1. In this way, a user can navigate horizontally between movie titles, and navigate vertically to access additional content associated with each movie title.

In one embodiment, the selection pane 12 may remain stationary within the center of the display, with digital media assets moving into and out of the selection pane 12. This may then cause stack indicators 16 to expand into a stack 14 as a digital media asset moves into the selection pane 12, or a stack 14 to collapse into a stack indicator 16 when a digital media asset moves out of the selection pane 12. In this embodiment, the centered selection pane 12 acts as a sort of "focus" point through which digital media assets move in and out.

In a more specific implementation, the disclosed interface 10 may be implemented on a computing module able to receive a user directional input having a particular velocity or directional momentum, such as a touch screen on a tablet device or a smart phone, a track pad on a personal computing device, or a camera-based movement input, e.g., a Microsoft Kinect. The user may be able to scroll quickly in the horizontal direction, causing stack indicators 16 to quickly expand and collapse as they move into and out of the selection pane 12, causing a particular curve-forming visual effect.

In an even further embodiment, the speed at which a user is able to scroll through particular digital media assets may vary based on a "weight" given to particular digital media assets. For example, a digital media producer may want a user's attention to be drawn to particular digital media assets. This may be done by assigning "weights" to digital media assets so that when a user is quickly scrolling, those assets that are assigned a greater "weight" or importance are visible for a longer time, by, for example, remaining within the selection pane for a longer time, than those digital media assets with less "weight." Assets that are assigned a greater "weight" may also have a greater tendency for the selection pane 12 to stop on those assets at the end of a user's scrolling action. Weight values may also be taken into account when producing automatic stacks or determining the ordering of digital media assets horizontally such that those digital media assets with greater weight are placed in an area of greater visibility, e.g., closer to the selection pane 12.

In alternative embodiments, the selection pane 12 may move horizontally or vertically among the digital media assets, rather than being fixed in the center of the display.

Stacks 16 may be composed of related digital media assets. For example, for a feature film digital media asset, stacks might include special features (deleted scenes, director commentary, etc.) for the digital media asset, or prequels or sequels to a digital media asset, or other digital media assets within the same franchise. In other embodiments, stacks may be based on a particular theme, such as a stack including "princess" movies. Stacks may be based on genre, such as an action stack or a comedy stack. Or the stack may be based on shared actors or actresses. Any other categorization may be used to create stacks, and categorization criteria information may be automatically included as part of the digital media asset, or they may be defined by a user, e.g., the user may select a number of digital media assets to include in particular stacks, or identify certain digital media assets as belonging to a particular categorization criteria group. The interface 10 may further include a stack generation menu for the user to create custom stacks, or to select one or more categorization criteria that may be used to automatically form stacks.

In another embodiment, stacks may comprise a multi-direction aspect such that multiple stacks may extend radially from the selection pane 12, and each stack may be based on a different categorization criteria. For example, an upward stack may include bonus content for a digital media asset, while a downward stack may include other digital media assets within the same franchise, or there may be multiple downward or upward stacks extending at different radial angles from the selection pane 12.

Figure 2:
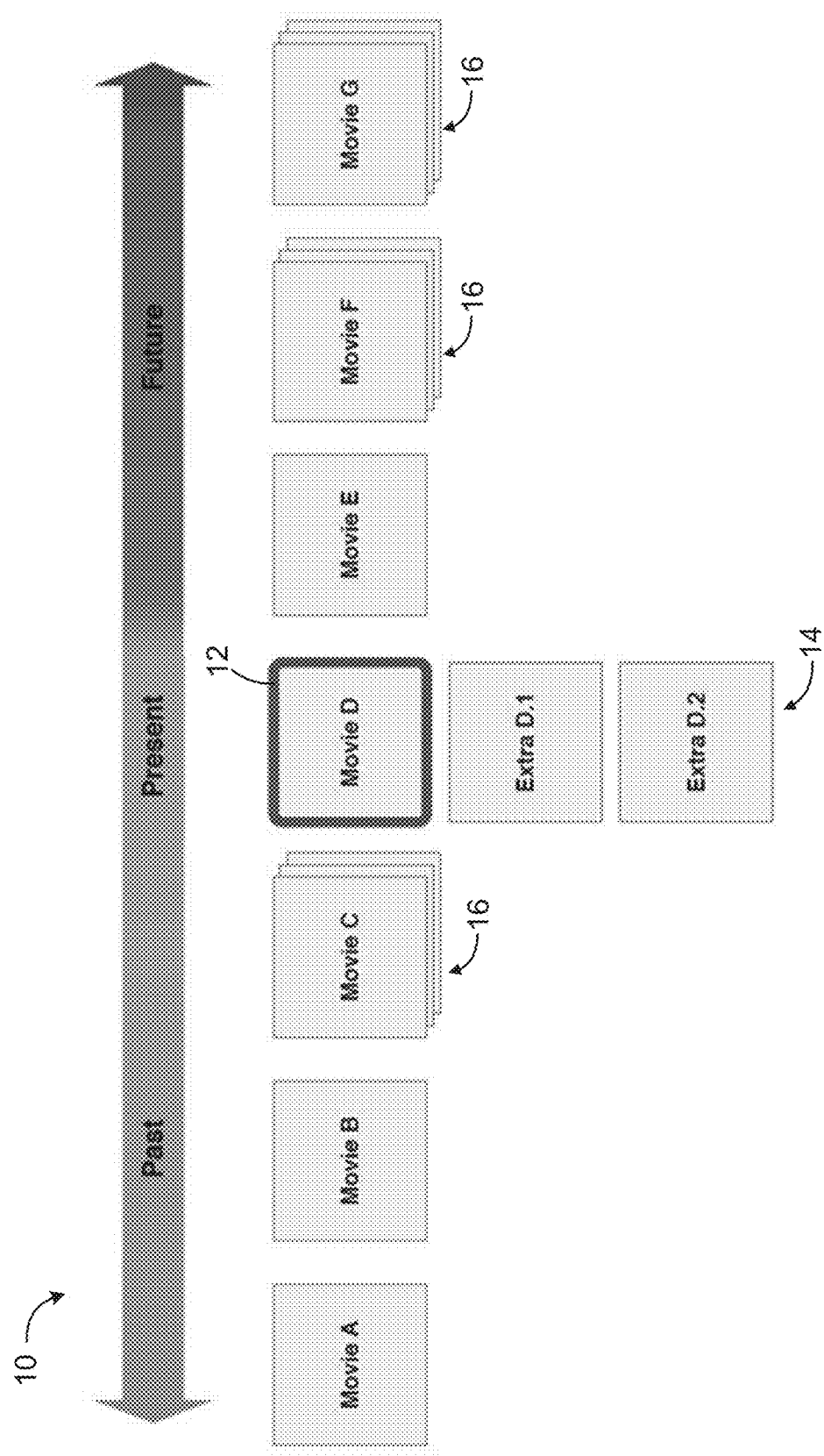
FIG. 2 depicts a further timeline aspect of a more particular embodiment of the example digital media selection interface of FIG. 1.

FIG. 2 provides a more particular time-line based embodiment of the user interface. In the depicted embodiment, the digital media asset that has just been completed, or the "present" digital media asset, is presented in the selection pane 12 in the center of the display ("Movie D"). Digital media assets that have previously been viewed are presented to the left of the "present" digital media asset, and recommended digital media assets that have not yet been viewed are presented to the right of the digital media asset. Each of the presented digital media assets may then have additional, associated digital media assets "stacked" underneath them vertically in the stack 14 or the stack indicators 16. This time-lined based embodiment provides the user with a timeline of digital media assets such that previously played assets are listed to the left, and future digital media assets (such as suggested or recommended digital media assets) are listed to the right.

The ordering of digital media assets both to the left (past) and to the right (future) can be performed in numerous ways, a few of which will now be discussed. Digital media assets listed to the left of the selection pane 12, representing "the past," may include digital media assets that the user has previously played, or previously purchased. These may be listed in chronological order, such that the ordering of digital media assets to the left represent a chronological viewing history in the order that the user has played the digital media assets. Alternatively, the ordering may be such that the most frequently played digital media assets are listed closer to the selection pane 12 for easier access by the user, to provide a user easy access to those digital media assets that he or she most frequently plays.

Digital media assets listed to the right of the selection pane 12, representing the "future," may include digital media assets that the user owns but has not yet played, or may include digital media assets that the user has not yet purchased, or free digital media assets that the user has not yet accessed. Determination of which digital media assets to include in the "future" portion of the interface 10 may be based on the user's past viewing preferences such that the user may be presented with options that are most likely compatible with the user's preferences based on the past viewing history. For example, if the user has recently viewed several animated films, or films of a particular genre, then the recommended "future" films may include animated films or other films within the genre. In this way, the "future" digital media assets may provide a user with an opportunity to explore digital media assets that may appeal to the user, but the user has not yet purchased, downloaded, or accessed. Future recommended digital media assets may be recommended based on an algorithm that takes into account a plurality of parameters, such as a user's past viewing preferences, the location of the user, the user's age or gender, or other characteristics that may be relevant in determining which digital media assets may appeal to a particular user.

Stacks may assist in performing this function as well, as stacks may include digital media assets that the user does not yet own, but are related to digital media assets that have been purchased and viewed by the user. For example, if the user views a first film, the stack beneath that film may include a sequel to the film that the user has not yet purchased or viewed, or a trailer to an upcoming sequel that the user can view.

In a more particular embodiment, the background of the interface may change based on the digital media assets in a stack, a combination of the digital media assets in a stack, or based on the stack itself. The interface may also provide an indication of the direction and/or depth the user has traversed from its original starting point through aural and visual stimulation on the interface. Such indicators may be based on the "timeline" theme discussed above. For example, the user may hear the sound of a clock ticking as they scroll in a particular direction, and the speed of the click ticking and/or the volume of the sound may indicate how far from the "present" the user has traversed. An example of a visual indicator may include a number of small pocketwatches floating on the screen with the size and/or number of clocks being indicative of how far the user has traversed into the "past" or the "future."

Figure 3:
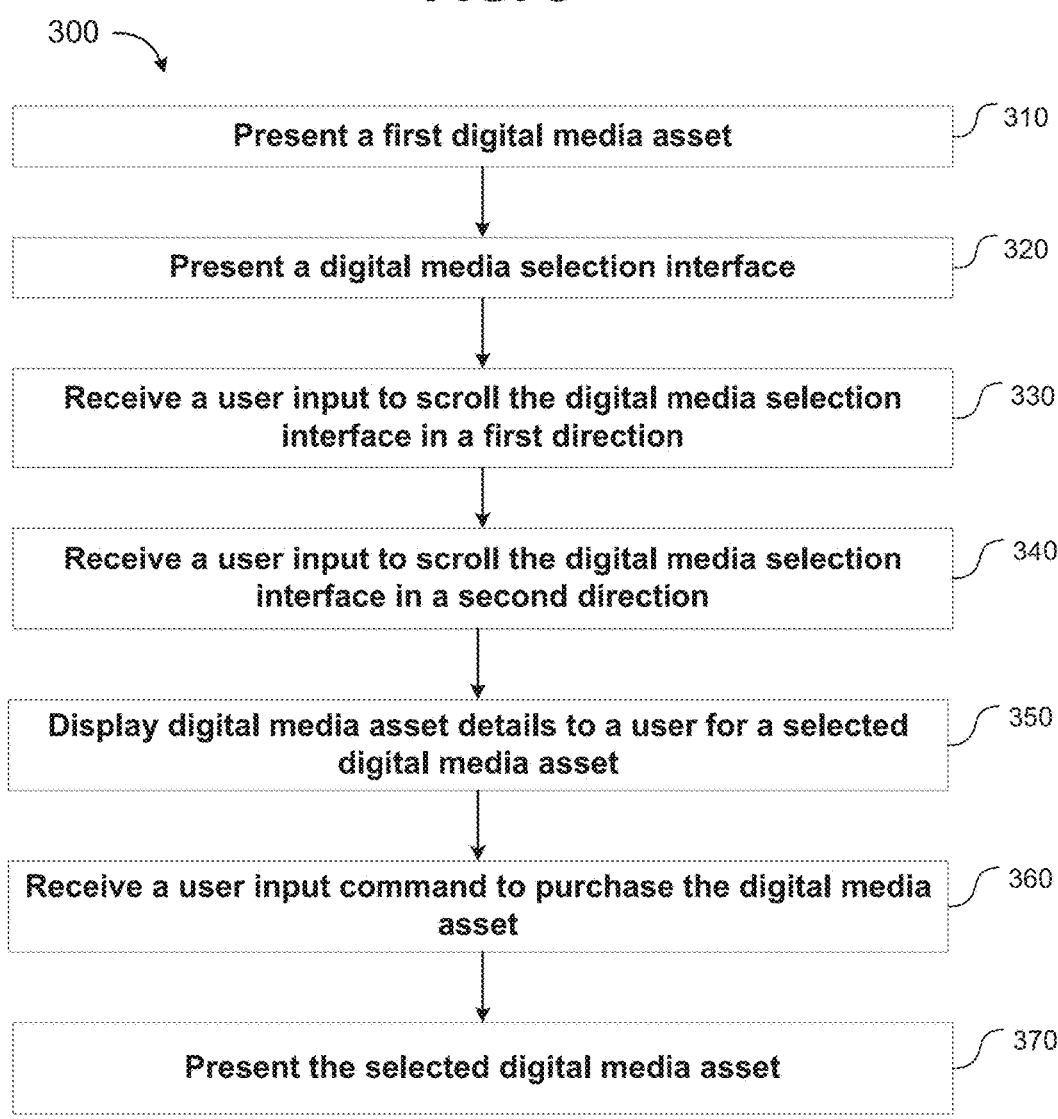
FIG. 3 is a flow chart depicting a method of navigating a digital media selection interface in accordance with an embodiment of the present disclosure.

FIGS. 3-7 provide an exemplary method and exemplary screenshots of how an embodiment of the disclosed interface could be implemented. FIG. 3 provides a flowchart of an exemplary digital asset selection interface method 300. First, in step 310, a first digital media asset is presented to a user. In step 320, the user is then presented with a digital media selection interface. The digital media selection interface may comprise the just-watched digital media asset in the center, and other digital media assets to the left and right, and related digital media assets listed vertically in stacks. As discussed in FIG. 2, the horizontal arrangement of digital media assets may be based on a "time-line" approach, in which previously viewed assets are listed to the left, and recommended future views are listed to the right. In step 330, a user input is received to scroll the digital media selection interface in a first direction, and then in step 340, a user input is received to scroll the digital media selection interface in a second direction. In step 350, digital media asset details are displayed to a user for a selected digital media asset. In step 360, a user input command is received to purchase the selected digital media asset. Finally, in step 370, the selected digital media asset that was purchased in step 360 is presented to the user.

Figure 4:
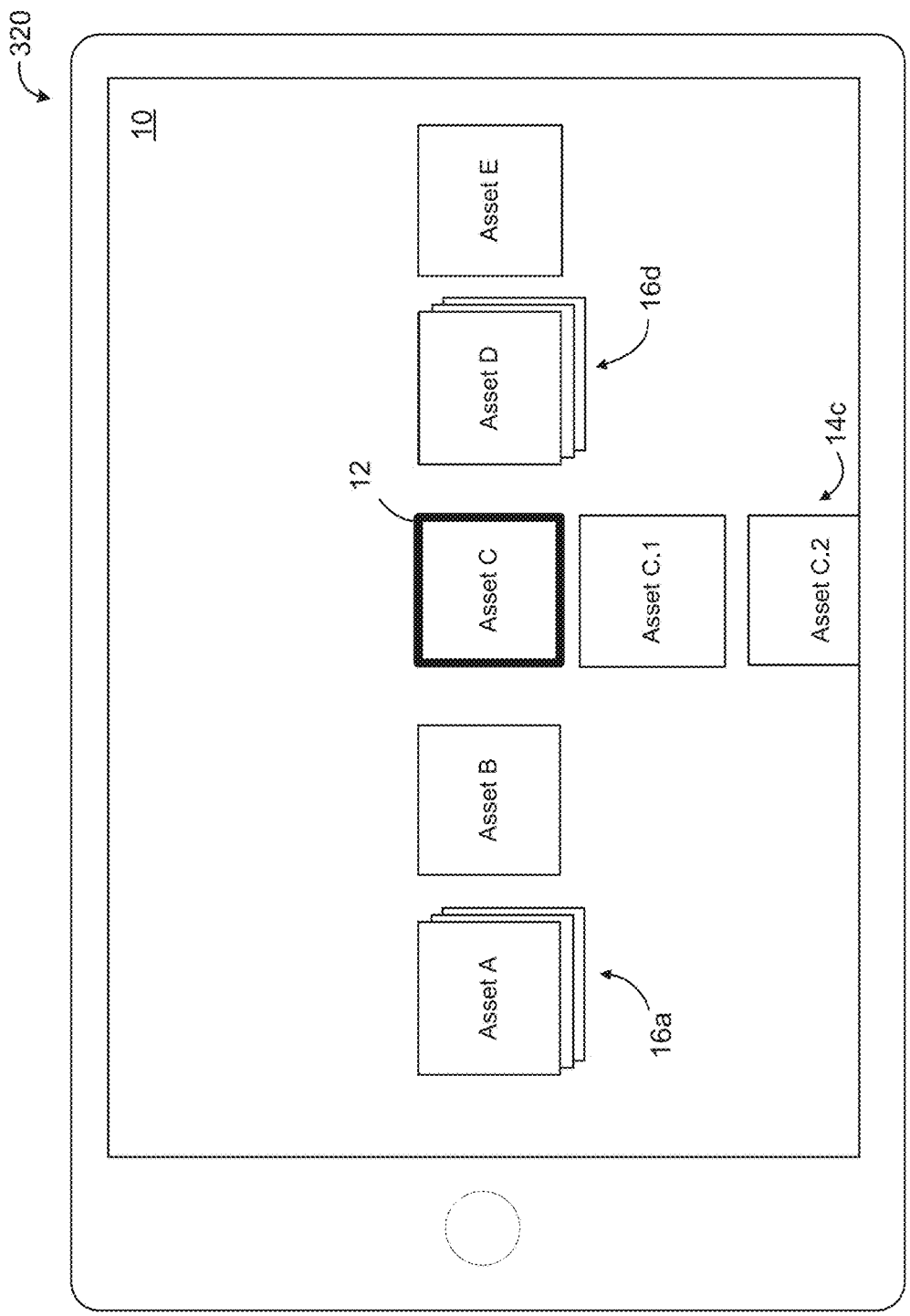
FIGS. 4-7 provide exemplary interface diagrams demonstrating particular steps of the method flow chart of FIG. 3.

FIGS. 4-7 provide sample screenshots depicting the steps of the digital asset selection interface method 300 of FIG. 3. In this example, the digital asset selection interface method 300 has been implemented on a tablet style computing device. However, it should be understood that it may be implemented on any appropriate computing device. In FIG. 4, a digital media asset, Asset C, has just been played (step 310). Once it is completed, a digital media interface 10 is displayed to the user (step 320). Near the center of the display is a selection pane 12 with the just-played digital media asset (Asset C) in the selection pane. Under Asset C in the stack 14 are additional assets C.1 and C.2 that are related to Asset C.

Figure 5:
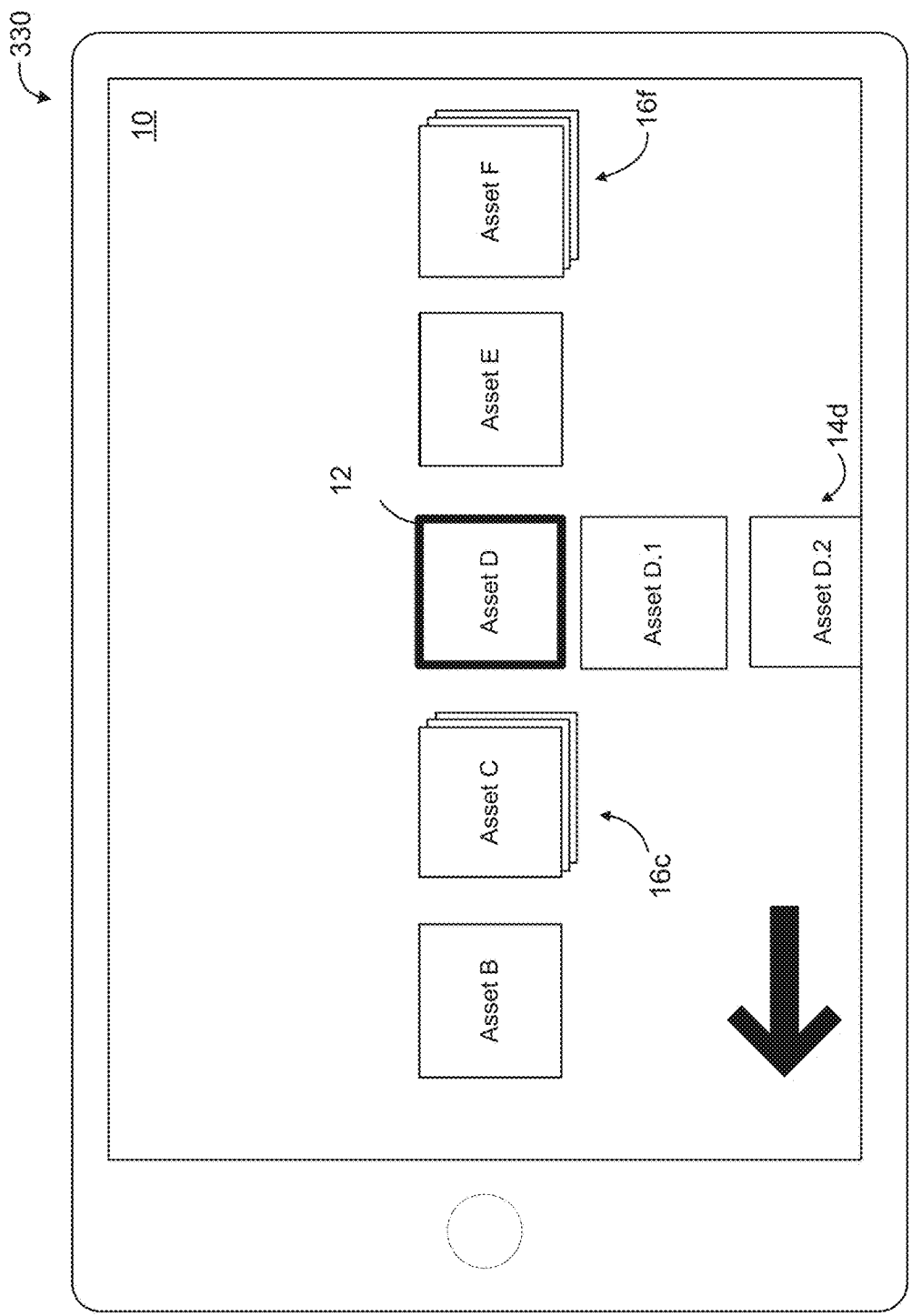
Figure 6:
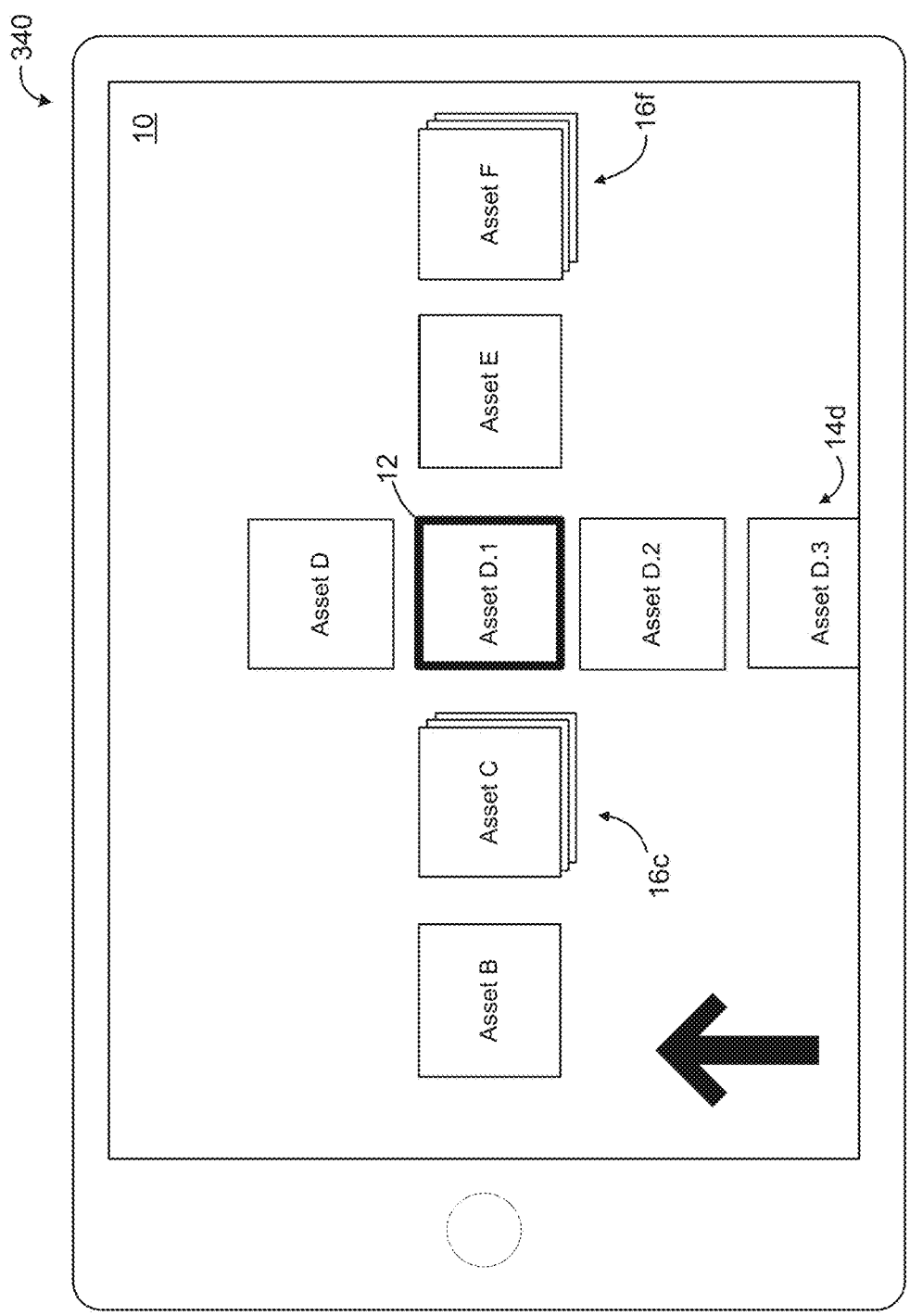
Figure 7:
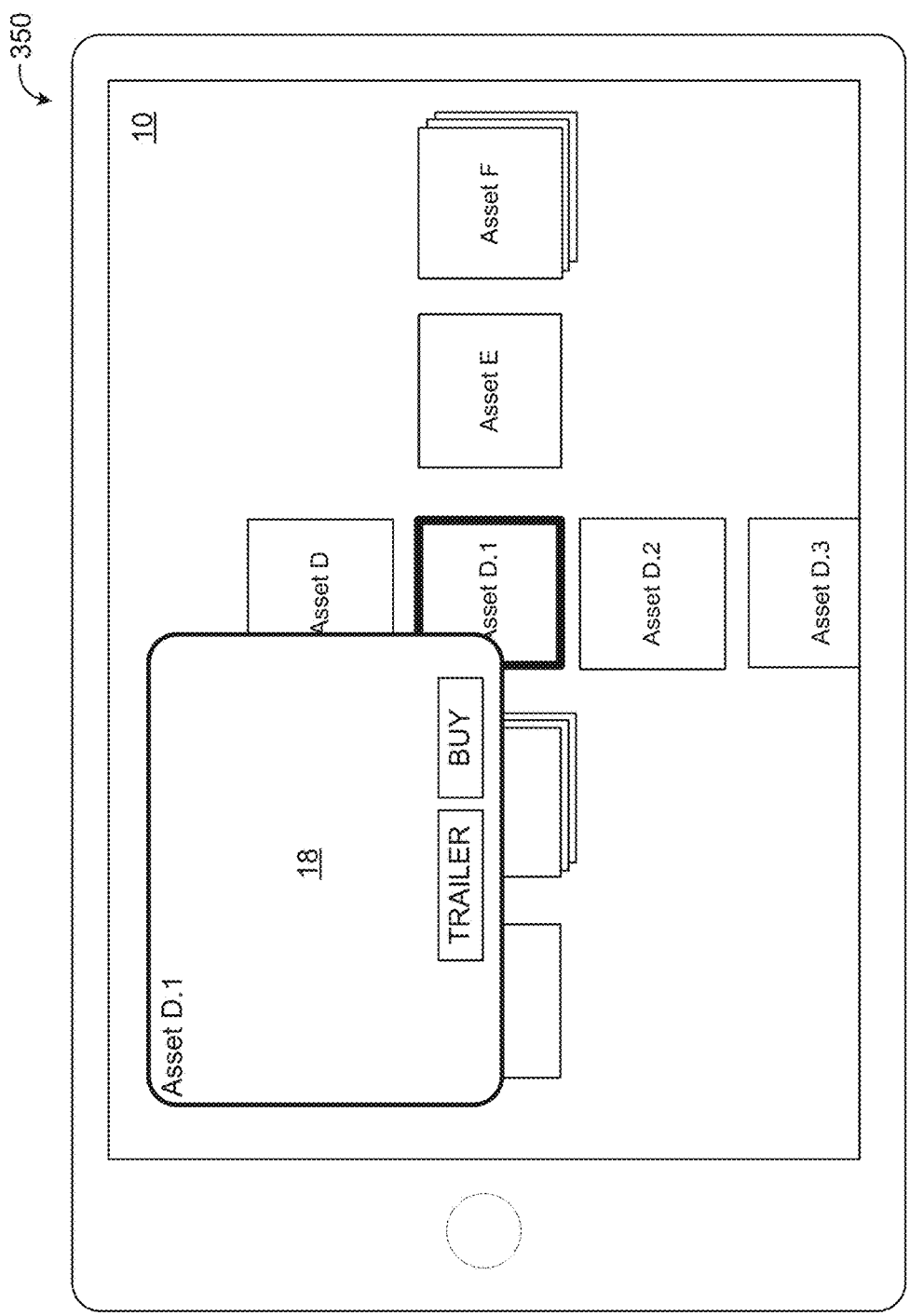

In FIG. 5, the user has scrolled to the right to access Asset D (step 330). The stack 14c under Asset C has been collapsed into a stack indicator 16c, and the stack indicator 16d that was under Asset D has been expanded into a stack 14d. All of the assets have been shifted in the horizontal direction, such that the leftmost asset, Asset A, has moved off screen, and Asset F has been shifted from off screen to the rightmost position. In FIG. 6, the user has scrolled vertically downward to access some of the digital media assets that are related to Asset D (step 340). In FIG. 7, the user has selected Asset D.1 to bring up a details pane 18 (step 350). From this screen, the user is then able to watch a trailer, or purchase the item if they do not already own it (step 360), or watch it if they do already own it (step 370).

While the above interface and methods have been described with respect to a post-viewing experience that is presented to a user once a digital media asset has completed playing, it will be understood that the disclosed interfaces and methods may be presented at any time. For example, a user may being playing a movie, but may push the movie to the background to keep it playing in the background while the user scrolls through the digital media asset selection interface to select a next digital media asset to be played. Or in another embodiment, a digital media asset may be playing on a first display of a computing device, while on a second display (either on the same computing device or a connected secondary computing device), the user can scroll through the selection interface.

Where components or modules of the disclosed interface are implemented in whole or in part using software, in one embodiment, these software elements can be implemented to operate with a computing or processing module capable of carrying out the functionality described with respect thereto. After reading this description, it will become apparent to a person skilled in the relevant art how to implement the disclosure using other computing modules or architectures.

As used herein, the term module might describe a given unit of functionality that can be performed in accordance with one or more implementations. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Figure 8:
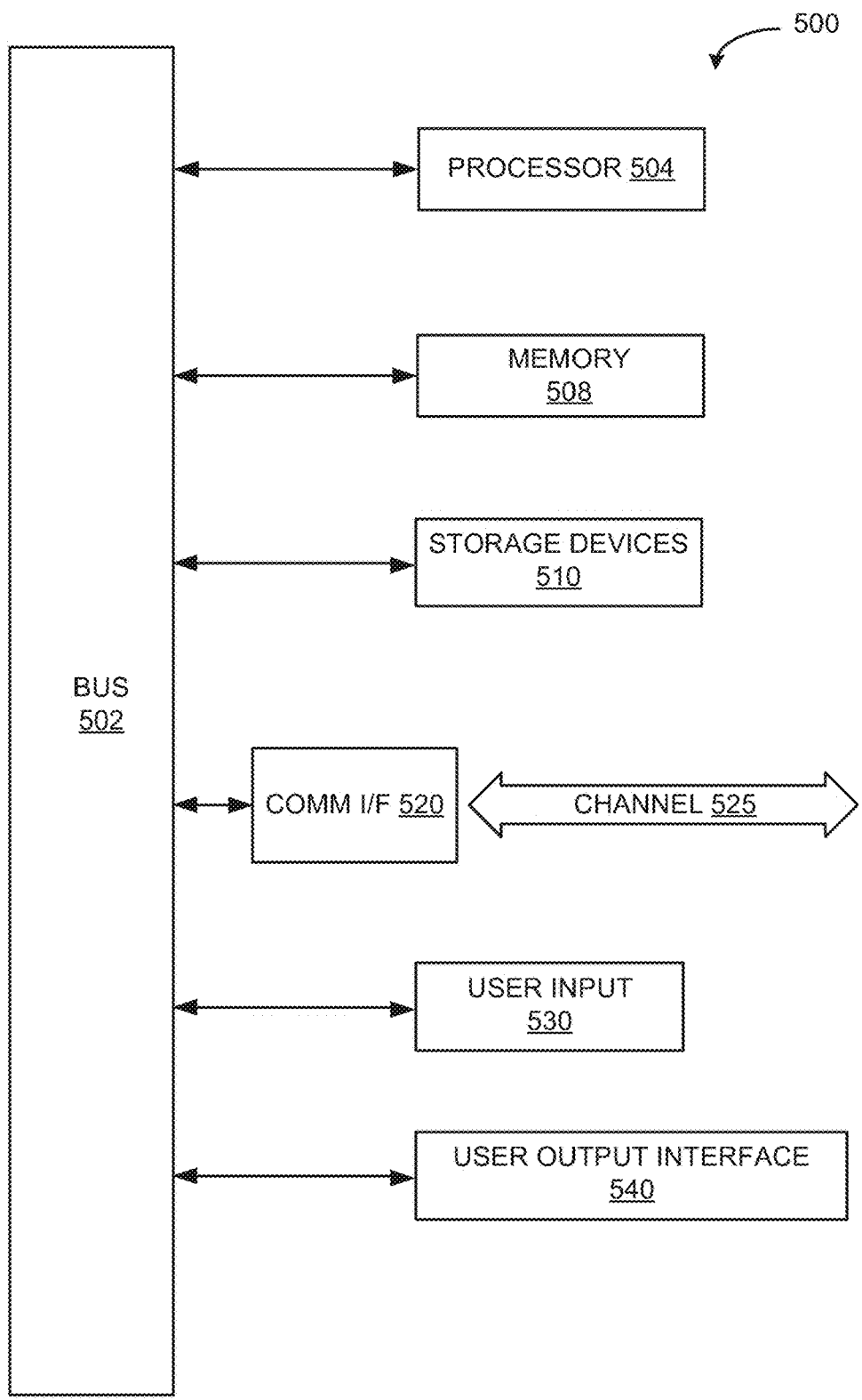
FIG. 8 provides an example computing module that may be used to implement certain aspects of the present disclosure.

Referring now to FIG. 8, computing module 500 may represent, for example, computing or processing capabilities found within desktop, laptop and notebook computers; hand-held computing devices (PDA's, smart phones, cell phones, palmtops, tablets, etc.); or any other type of special-purpose or general-purpose computing devices as may be appropriate. Computing module 500 might also represent computing capabilities embedded within or otherwise available to a given device. For example, a computing module might be found in other electronic devices such as, for example, televisions, home theaters, Blu-Ray disc players, DVD players, in-car entertainment systems, video game consoles, video download or streaming devices, portable DVD players, and other electronic devices that might include some form of processing capability.

Computing module 500 might include, for example, one or more processors, controllers, control modules, or other processing devices, such as a processor 504. Processor 504 might be implemented using a general-purpose or special-purpose processing engine such as, for example, a microprocessor, controller, or other control logic. In the illustrated example, processor 504 is connected to a bus 502, although any communication medium can be used to facilitate interaction with other components of computing module 500 or to communicate externally.

Computing module 500 might also include one or more memory modules, simply referred to herein as main memory 508. Memory may include any non-transitory storage medium. For example, preferably random access memory (RAM) or other dynamic memory, might be used for storing information and instructions to be executed by processor 504. Main memory 508 might also be used for storing temporary variables or other intermediate information during execution of instructions to be executed by processor 504. Computing module 500 might likewise include a read only memory ("ROM") or other static storage device coupled to bus 502 for storing static information and instructions for processor 504. The computing module 500 might also include one or more various forms of information storage mechanism 510, which might include, for example, a magnetic tape drive, an optical disc drive, a solid state drive, or any other non-volatile memory.

Computing module 500 might also include a communications interface 520. Communications interface 520 might be used to allow software and data to be transferred between computing module 500 and external devices. Examples of communications interface 520 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 520 might typically be carried on signals, which can be electronic, electromagnetic (which includes optical) or other signals capable of being exchanged by a given communications interface 520. These signals might be provided to communications interface 520 via a channel 525. This channel 525 might carry signals and might be implemented using a wired or wireless communication medium. Some examples of a channel might include a phone line, a cellular link, an RF link, an optical link, a network interface, a local or wide area network, and other wired or wireless communications channels.

Computing module 500 might also include one or more user inputs 530. The user input allows for the user to enter commands to the computing module 500 and interact with it. Examples of user inputs might include a computer mouse, a keyboard, a touch-sensitive screen, a mousepad, a joystick, an accelerometer, a gyroscope, or any other user input mechanism. These user inputs may be used to interact with the disclosed interface. For example, if the computing device is a tablet device with a touchscreen, the user may swipe to the left or the to the right to move through the digital media assets horizontally, swipe up or down to the move through the assets vertically, and tap the screen to make selections of digital media assets. Alternatively, if the computing device is a television, then the user might use a remote control or other remote input means to move horizontally or vertically or to make a selection. Similarly, if the computing device is a keyboard, a mouse or keyboard or trackpad may be used to interact with the user interface.

The computer module 500 might also include one or more user output interfaces 540. The user output interfaces 540 might be used to interact with the user by presenting information or sensory outputs for the user. Examples of user output interfaces might include visual outputs, such as a display screen or monitor, or audio outputs, such as a speaker or headphone output.

In this document, the terms "computer program medium" and "computer usable medium" are used to generally refer to media such as, for example, memory 508, storage unit 510, and channel 525. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 500 to perform features or functions of the present disclosure as discussed herein.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features. Additionally, with regard to flow diagrams, operational descriptions and method claims, the order in which the steps are presented herein shall not mandate that various embodiments be implemented to perform the recited functionality in the same order unless the context dictates otherwise. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

Although the disclosure has been presented with reference only to the presently preferred embodiments, those of ordinary skill in the art will appreciate that various modifications can be made without departing from this disclosure.

The invention claimed is:

1. A digital media asset interface method comprising:
presenting a digital media selection interface; and
receiving a user input via a user input device, wherein
the digital media selection interface presents the user with a plurality of digital media assets, and further wherein
a first subset of the plurality of digital media assets is presented along a first axis such that the user can navigate the first subset of the plurality of digital media assets in two directions along the first axis,
a second subset of the plurality of digital media assets is presented along a second axis such that the user can navigate the second subset of the plurality of digital media assets in two directions along the second axis,
the first subset of the plurality of digital media assets comprising a past portion presented along one of the two directions along the first axis and a future portion presented along the other of the two directions along the first axis such that
the past portion comprises a plurality of past digital media assets that have been previously presented,
the future portion comprises a plurality of recommended digital media assets,
an intersection of a first digital media asset, the first digital media asset being a member of the first subset of the plurality of digital media assets, and one or more of the second subset of the plurality of digital media assets presented along the second axis is indicative of a non-temporal, content-based relationship between the first digital media asset and each of the second subset of the plurality of digital media assets,
presenting at least one of aural and visual stimulation through the digital media selection interface indicating directions traveled along the first and second axes and depth of traversal through the first and second subsets of the plurality of digital media assets, and
controlling at least one of a rate of scrolling through the first and second subsets of the plurality of digital media assets, and placement of individual ones of the first and second subsets of the plurality of digital media assets proximate to the intersection based upon weight information associated with the plurality of digital media assets.

2. The method of claim 1, wherein the first digital media asset is presented in a central region of the digital media selection interface and the plurality of digital media assets are presented in the areas surrounding the central region.

3. The method of claim 2, wherein the first digital media asset is presented in a central region of the digital media selection interface, the first subset of the plurality of digital media assets are presented horizontally from the first digital media asset, and the second subset of the plurality of digital media assets are presented vertically from the first subset of the plurality of digital media assets.

4. The method of claim 3, wherein receiving a user input via a user input device comprises:
receiving a first user input to navigate the digital media selection interface in a horizontal direction to a second digital media asset, the second digital media asset being a member of the first subset of the plurality of digital media assets; and
receiving a second user input to navigate the digital media selection interface in a vertical direction to a third digital media asset, the third digital media asset being a member of the second subset of the plurality of digital media assets.

5. The method of claim 3, wherein the past portion is presented to the left of the first digital media asset and the future portion is presented to the right of the first digital media asset.

6. The method of claim 5, wherein the future portion comprises one or more digital media assets that have not been purchased.

7. The method of claim 6, wherein receiving a user input via a user input device comprises:
receiving a first user input to navigate the digital media selection interface in a rightward direction to a second digital media asset, the second digital media asset being a member of the plurality of future digital media assets that have not been purchased; and
receiving a second user input to purchase the second digital media asset.

8. The method of claim 3, wherein receiving a user input via a user input device comprises:
receiving a user horizontal scroll input, causing the first subset of the plurality of digital media assets to scroll in the horizontal direction
in accordance with the rate of scrolling based upon the weight information associated with the plurality of digital media assets affects the rate of scrolling caused by the user horizontal scroll input such that a tendency to stop on a particular one of the plurality of digital media assets is impacted by the weight information.

9. The method of claim 1, further comprising presenting a first digital media asset on a first display, wherein
presenting a digital media selection interface comprises presenting the digital media selection interface on a second display.

10. A non-transitory computer readable medium comprising:
an instruction set configured to cause a computing device to perform:
presenting a digital media selection interface, and
receiving a user input via an input device, wherein
the digital media selection interface presents the user with a plurality of digital media assets, and further wherein
a first subset of the plurality of digital media assets is presented along a first axis such that the user can navigate the first subset of the plurality of digital media assets in two directions along the first axis,
a second subset of the plurality of digital media assets being presented along a second axis such that the user can navigate the second subset of the plurality of digital media assets in two directions along the second axis,
the first subset of the plurality of digital media assets comprising a past portion presented along one of the two directions along the first axis and a future portion presented along the other of the two directions along the first axis such that
the past portion comprises a plurality of past digital media assets that have been previously presented;
the future portion comprises a plurality of recommended digital media assets,
an intersection of a first digital media asset, the first digital media asset being a member of the first subset of the plurality of digital media assets presented along the first axis, and one or more of the second subset of the plurality of digital media assets presented along the second axis is indicative of a non-temporal, content-based relationship between the first digital media asset and each of the second subset of the plurality of digital media assets,
presenting at least one of aural and visual stimulation through the digital media selection interface indicating directions traveled along the first and second axes and depth of traversal through the first and second subsets of the plurality of digital media assets, and
controlling at least one of a rate of scrolling through the first and second subsets of the plurality of digital media assets, and placement of individual ones of the first and second subsets of the plurality of digital media assets proximate to the intersection based upon weight information associated with the plurality of digital media assets.

11. The non-transitory computer readable medium of claim 10, wherein the first digital media asset is presented in a central region of the digital media selection interface and the plurality of digital media assets are presented in the areas surrounding the central region.

12. The non-transitory computer readable medium of claim 11, wherein the first digital media asset is presented in a central region of the digital media selection interface, the first subset of the plurality of digital media assets are presented horizontally from the first digital media asset, and the second subset of the plurality of digital media assets are presented vertically from the first subset of the plurality of digital media assets.

13. The non-transitory computer readable medium of claim 12, wherein receiving a user input via a user input device comprises:
receiving a first user input to navigate the digital media selection interface in a horizontal direction to a second digital media asset, the second digital media asset being a member of the first subset of the plurality of digital media assets; and
receiving a second user input to navigate the digital media selection interface in a vertical direction to a third digital media asset, the third digital media asset being a member of the second subset of the plurality of digital media assets.

14. The non-transitory computer readable medium of claim 12, wherein the past portion is presented to the left of the first digital media asset and the future portion is presented to the right of the first digital media asset.

15. The non-transitory computer readable medium of claim 12, wherein the future portion comprises one or more digital media assets that have not been purchased.

16. The non-transitory computer readable medium of claim 15, wherein receiving a user input via a user input device comprises:
receiving a first user input to navigate the digital media selection interface in a rightward direction to a second digital media asset, the second digital media asset being a member of the plurality of future digital media assets that have not been purchased; and
receiving a second user input to purchase the second digital media asset.

17. The non-transitory computer readable medium of claim 12, wherein receiving a user input via a user input device comprises:
receiving a user horizontal scroll input, causing the first subset of the plurality of digital media assets to scroll in the horizontal direction in accordance with the rate of scrolling based upon the weight information associated with the plurality of digital media assets affects the rate of scrolling caused by the user horizontal scroll input such that a tendency to stop on a particular one of the plurality of digital media assets is impacted by the weight information.

18. The non-transitory computer readable medium of claim 10, wherein the instruction set is further configured to cause a computing device to perform:
presenting a first digital media asset on a first display, wherein
presenting a digital media selection interface comprises presenting the digital media selection interface on a second display.

19. A digital media selection interface method comprising:
displaying on a media presentation device, a selection pane indicating a current digital media asset selection;
displaying on the media presentation device, a first set of digital media assets presented along a horizontal axis in two directions from the selection pane;
displaying on the media presentation device, a second set of digital media assets presented along a vertical axis in two directions from the first set of digital media assets;
displaying on the media presentation device, a digital media stack formed by a first horizontal digital media asset that is a member of the first set of digital media assets, and one or more vertical digital media assets that are members of the second set of digital media assets, the first and second sets of digital media assets being browsable and selectable by a user of the media presentation device,
presenting on the media presentation device, at least one of aural and visual stimulation indicating directions traveled along the horizontal and vertical axes and depth of traversal through the first and second sets of digital media assets, and
controlling a rate of scrolling through the first and second sets of digital media assets based upon weight information associated with individual ones of the first and second sets of digital media assets, wherein
the first set of digital media assets presented in the two directions along the horizontal direction comprise:
a past portion that is presented to the left of the selection pane, and
a future portion that is presented to the right of the selection pane, and further wherein,
the past portion comprises a plurality of digital media assets that have been previously presented;
the future portion comprises a plurality of recommended digital media assets; and
an intersection of the one or more vertical digital media assets with the first horizontal digital media asset indicates a non-temporal, content-based relationship between the first horizontal digital media asset and each of the one or more vertical digital media assets, placement of individual ones of the first and second sets of digital media assets being based upon weight information associated with individual ones of the first and second sets of digital media assets.

20. The digital media selection interface method of claim 19, wherein the digital media stack is formed vertically from the selection pane.

21. The digital media selection interface method of claim 20, further comprising one or more digital media stack indicators, wherein
the one or more digital media stack indicators are associated with one or more members of the first set of digital media assets presented in a horizontal direction, such that
the one or more digital media stack indicators indicate that a digital media stack will be formed when the associated member of the first set of digital media assets is positioned within the selection pane.

22. The digital media selection interface method of claim 19, wherein the future portion comprises a plurality of digital media assets that have not been purchased.

23. The digital media selection interface method of claim 19, wherein the selection pane remains stationary in a central region of the digital media selection interface.

24. The digital media selection interface method of claim 19, further comprising a timeline indicator that provides the user with an indication of how far they have scrolled in a particular direction.

* * * * *